US008525840B2

(12) United States Patent
Hendry et al.

(10) Patent No.: US 8,525,840 B2
(45) Date of Patent: Sep. 3, 2013

(54) THERMAL MANAGEMENT OF GRAPHICS PROCESSING UNITS

(75) Inventors: Ian Hendry, San Jose, CA (US); Anthony Graham Sumpter, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 727 days.

(21) Appl. No.: 12/212,805

(22) Filed: Sep. 18, 2008

(65) Prior Publication Data

US 2009/0284534 A1  Nov. 19, 2009

Related U.S. Application Data

(60) Provisional application No. 61/053,519, filed on May 15, 2008.

(51) Int. Cl.
*G06F 15/00* (2006.01)
*G06F 1/00* (2006.01)

(52) U.S. Cl.
USPC ............................ 345/501; 713/300; 713/500

(58) Field of Classification Search
USPC .......... 345/501; 713/300–340, 375, 500–601
See application file for complete search history.

(56) References Cited

U.S. PATENT DOCUMENTS

| | | |
|---|---|---|
| 4,104,523 A | 8/1978 | Wolfert |
| 4,614,528 A | 9/1986 | Lennen |
| 4,620,248 A | 10/1986 | Gitzendanner |
| 4,863,499 A | 9/1989 | Osendorf |
| 4,982,783 A | 1/1991 | Fickett et al. |
| 5,025,336 A | 6/1991 | Morehouse et al. |
| 5,148,337 A | 9/1992 | Cullen et al. |
| 5,392,177 A | 2/1995 | Chainer et al. |
| 5,440,172 A | 8/1995 | Sutrina |
| 5,781,768 A | 7/1998 | Jones, Jr. |
| 5,822,596 A * | 10/1998 | Casal et al. ................... 713/322 |
| 5,905,636 A | 5/1999 | Baska et al. |
| 6,076,171 A | 6/2000 | Kawata |
| 6,143,058 A | 11/2000 | Dahlgren et al. |

(Continued)

FOREIGN PATENT DOCUMENTS

| | | |
|---|---|---|
| CN | 1666166 A | 9/2005 |
| JP | 200422928 | 1/2004 |

OTHER PUBLICATIONS

International Search Report and Written Opinion, PCT/US2009/041446, 21 pages, Feb. 12, 2010.

(Continued)

*Primary Examiner* — Tize Ma
*Assistant Examiner* — Yingchun He
(74) *Attorney, Agent, or Firm* — Fletcher Yoder PC (57) ABSTRACT

Some embodiments include a graphics processing with thermal management capabilities. The graphics processing unit may include a display controller, a microprocessing engine coupled to the display controller, and a clock circuit coupled to the display controller and the microprocessing engine. The clock circuit may further include a raw clock signal coupled to the display controller, a divider coupled to the raw clock signal, and a multiplexer coupled to the divider. The divider may generate a divided version of the raw clock signal, which may be coupled to the multiplexer along with the raw clock signal. The multiplexer may selectively provide the raw clock signal and/or the divided version of the clock signal to the microprocessing engine such that the microprocessing engine may receive a timing signal that is independent of operations of the graphics processing unit and result in fewer glitches.

40 Claims, 3 Drawing Sheets

(56) References Cited

U.S. PATENT DOCUMENTS

| | | |
|---|---|---|
| 6,243,656 B1 | 6/2001 | Arai et al. |
| 6,286,212 B1 | 9/2001 | Eaton |
| 6,407,595 B1 * | 6/2002 | Huang et al. .................. 327/114 |
| 6,462,410 B1 | 10/2002 | Novotny et al. |
| 6,504,243 B1 | 1/2003 | Andric et al. |
| 6,624,816 B1 | 9/2003 | Jones, Jr. |
| 6,687,320 B1 * | 2/2004 | Chiu et al. .................... 375/376 |
| 6,778,387 B2 | 8/2004 | Fairchild |
| 6,803,328 B2 | 10/2004 | McCullough |
| 6,832,410 B2 | 12/2004 | Hedge |
| 6,886,625 B1 | 5/2005 | Sagal et al. |
| 6,891,724 B2 | 5/2005 | De Lorenzo et al. |
| 6,896,045 B2 | 5/2005 | Panek |
| 6,987,671 B2 | 1/2006 | Houle |
| 7,006,353 B2 | 2/2006 | Matteson |
| 7,045,885 B1 | 5/2006 | Chen et al. |
| 7,085,135 B2 | 8/2006 | Chu et al. |
| 7,125,433 B2 | 10/2006 | Garikipati et al. |
| 7,149,909 B2 | 12/2006 | Cui et al. |
| 7,190,585 B2 | 3/2007 | Houle |
| 7,269,015 B2 | 9/2007 | Hornung et al. |
| 7,433,191 B2 | 10/2008 | Blanco, Jr. et al. |
| 7,440,281 B2 | 10/2008 | Bailey et al. |
| 7,730,336 B2 | 6/2010 | Marinkovic et al. |
| 7,882,369 B1 * | 2/2011 | Kelleher et al. ............... 713/300 |
| 2001/0043225 A1 * | 11/2001 | Toffolo ........................ 345/531 |
| 2003/0107541 A1 * | 6/2003 | Naiki .............................. 345/87 |
| 2003/0210247 A1 | 11/2003 | Cui et al. |
| 2004/0238827 A1 | 12/2004 | Takayama et al. |
| 2005/0049729 A1 * | 3/2005 | Culbert et al. .................. 700/50 |
| 2005/0077614 A1 | 4/2005 | Chengalva et al. |
| 2006/0080062 A1 * | 4/2006 | Bose et al. ..................... 702/186 |
| 2006/0120051 A1 | 6/2006 | Macris et al. |
| 2006/0288249 A1 * | 12/2006 | Knepper et al. ............... 713/500 |
| 2007/0076378 A1 | 4/2007 | Blanco, Jr. et al. |
| 2007/0109292 A1 * | 5/2007 | Dahan et al. .................. 345/211 |
| 2007/0115290 A1 * | 5/2007 | Polzin et al. ................... 345/501 |
| 2007/0177367 A1 | 8/2007 | Bailey et al. |
| 2009/0044407 A1 | 2/2009 | Blanco, Jr. et al. |
| 2010/0103147 A1 | 4/2010 | Sumpter |

OTHER PUBLICATIONS

Invitation to Pay Additional Fees, PCT/US2009/041446, 5 pages, Sep. 23, 2009.

Chinese Office Action for Chinese Application No. 200980125004.X dated Dec. 13, 2012, 11 pgs.

* cited by examiner

FIG. 1

FIG. 2

THERMAL MANAGEMENT OF GRAPHICS PROCESSING UNITS

CROSS-REFERENCE TO RELATED APPLICATIONS

This application claims the benefit under 35 U.S.C. §119 (e) to U.S. Provisional Patent Application No. 61/053,519, filed May 15, 2008 and entitled "Thermal Management of Graphics Processing Units," the disclosure of which is hereby incorporated herein in its entirety.

TECHNICAL FIELD

The present invention relates generally to thermal management of electronic devices, and more particularly to providing thermal management of graphics processing units.

BACKGROUND

Electronic devices are ubiquitous in society and can be found in everything from wristwatches to computers. The complexity and sophistication of these electronic devices usually increases with each generation, and as a result, newer electronic devices often consume a greater amount of power than their predecessors. As the power consumption increases, the circuitry within the electronic device may generate increasing levels of heat, which may be detrimental to the operation of the circuitry.

To exacerbate this problem, the trend in modern electronic devices is to make each generation smaller. As a result, the temperature per unit volume coming from successive generations of electronic devices may rise to levels that are potentially hazardous to the user or the device itself. For this reason, microprocessors and other circuitry may be equipped with a heat sink and/or a fan to transfer heat away from the die and keep the microprocessor within safe operational ranges. Additional thermal management techniques also may be implemented such as selectively shutting down especially power-consumptive elements of an electronic device.

In addition to having increased power consumption, many modern electronic devices also have greater graphics abilities than their predecessors. This is especially true of personal computers where users may employ multiple monitors per computer, each of which may be capable of rendering complex computer graphic images. However, many modern computers' thermal management techniques may hinder the computer system's ability to provide sophisticated graphics abilities. For example, when the microprocessor enters low power modes one or more screen glitches may be present because the processor is not executing instructions. This may be especially true in computer systems with multiple displays and/or computer systems that are playing a movie.

Accordingly, there is a need for providing thermal management to computer systems that prevents screen glitches.

SUMMARY

Some embodiments include a graphics processing unit (GPU) with thermal management capabilities. The GPU may include a display controller, a microprocessing engine coupled to the display controller, and a clock circuit coupled to the display controller and the microprocessing engine. The clock circuit may further include a raw clock signal coupled to the display controller, a divider coupled to the raw clock signal, and a multiplexer coupled to the divider. The divider may generate a divided version of the raw clock signal, which may be coupled to the multiplexer along with the raw clock signal. The multiplexer may selectively provide the raw clock signal and/or the divided version of the clock signal to the microprocessing engine such that the microprocessing engine may receive a timing signal that is independent of operations of the GPU and result in fewer glitches.

Other embodiments may include a method of controlling a GPU, the method comprising the acts of providing a display controller a raw clock signal, generating a divided version of the raw clock signal, and providing to a microprocessing engine a timing signal that selectively comprises the raw clock signal or the divided version of the raw clock signal. In this manner, the microprocessing engine may execute operations at a reduced rate while the display controller operates at substantially the same rate of execution.

Still other embodiments may include a computer system with thermal management capabilities. The computer system may include a central processing unit (CPU), a GPU coupled to the CPU, one or more displays coupled to the GPU, and a regulator coupled to the GPU. The GPU may include a display controller, a microprocessing engine coupled to the display controller, and a clock circuit coupled to the display controller and the microprocessing engine. The clock circuit may further include a raw clock signal coupled to the display controller, a divider coupled to the raw clock signal, and a multiplexer coupled to the divider. The divider may generate a divided version of the raw clock signal, which may be coupled to the multiplexer along with the raw clock signal. The multiplexer may selectively provide the raw clock signal and/or the divided version of the clock signal to the microprocessing engine such that the microprocessing engine may receive a timing signal that is independent of operations of the GPU and result in fewer glitches on the one or more displays.

BRIEF DESCRIPTION OF THE DRAWINGS

The use of the same reference numerals in different drawings indicates similar or identical items.

DETAILED DESCRIPTION

The following discussion describes various embodiments that provide thermal management to graphical processing units while preventing screen glitches. Although one or more of these embodiments may be described in detail, the embodiments disclosed should not be interpreted or otherwise used as limiting the scope of the disclosure, including the claims. In addition, one skilled in the art will understand that the following description has broad application. Accordingly, the discussion of any embodiment is meant only to be exemplary and is not intended to intimate that the scope of the disclosure, including the claims, is limited to these embodiments.

Some embodiments include a graphics processing unit (GPU) with thermal management capabilities. The GPU may include a display controller, a microprocessing engine coupled to the display controller, and a clock circuit coupled to the display controller and the microprocessing engine. The clock circuit may further include a raw clock signal coupled to the display controller, a divider coupled to the raw clock signal, and a multiplexer coupled to the divider. The divider may generate a divided version of the raw clock signal, which may be coupled to the multiplexer along with the raw clock signal. The multiplexer may selectively provide the raw clock signal and/or the divided version of the clock signal to the microprocessing engine such that the microprocessing engine may receive a timing signal that is independent of operations of the GPU and result in fewer glitches.

Figure 1:
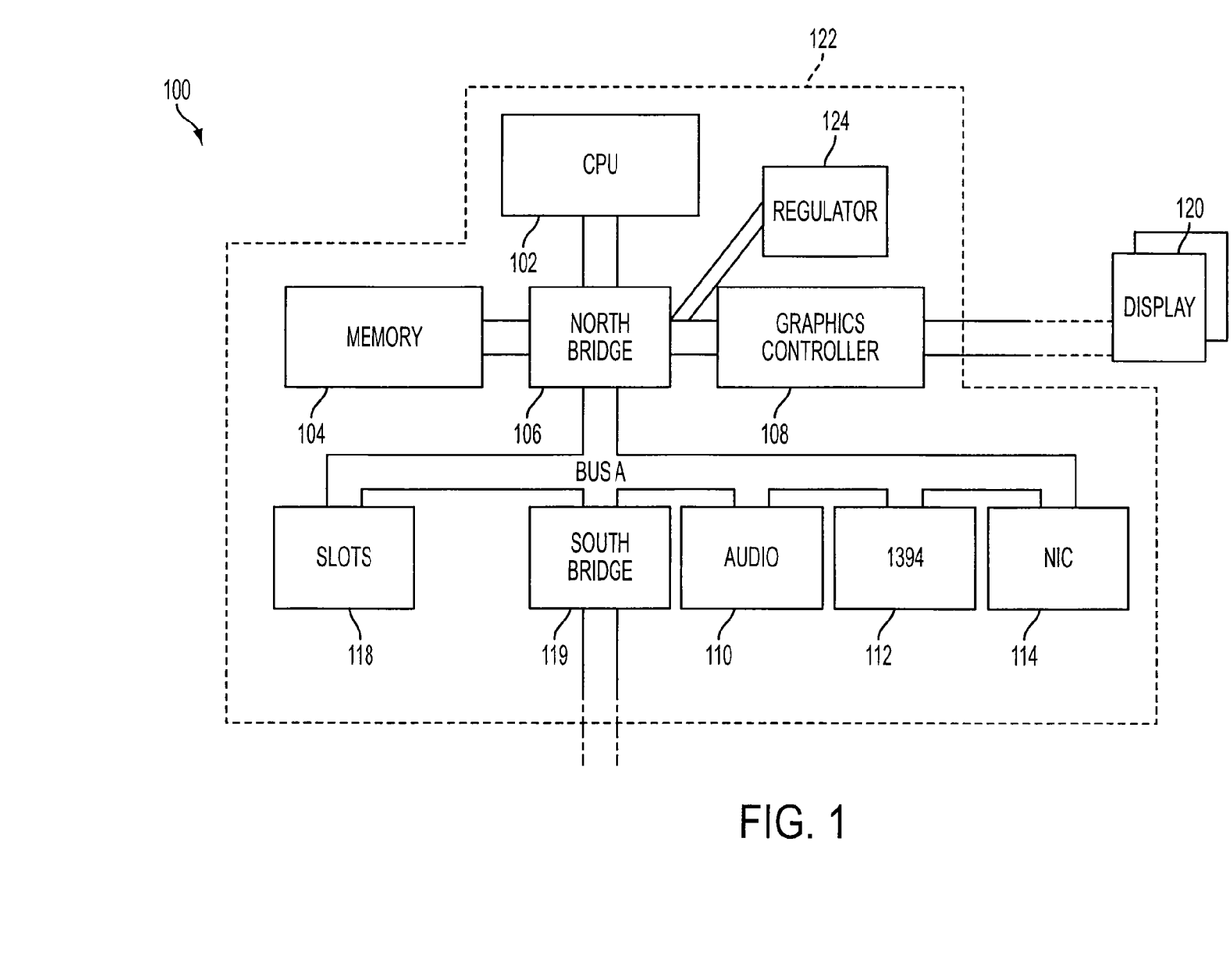
FIG. 1 illustrates an exemplary computer system.

FIG. 1 illustrates an exemplary computer system 100 that may be implemented in one embodiment. Prior to delving into the specifics of FIG. 1, it should be noted that the components listed in FIG. 1, and referred to below, are merely examples of one possible implementation. Other components, buses, and/or protocols may be used in other implementations without departing from the spirit and scope of the detailed description.

Referring now to FIG. 1, a computer system 100 includes a central processing unit (CPU) 102 that may be electrically coupled to a bridge logic device 106 by a CPU bus. The bridge logic device 106 is sometimes referred to as a "North bridge" vis-à-vis its position with respect to other systems components (such as the South bridge 119). The North bridge 106 may electrically couple to a main memory array 104 via a memory bus, and may further electrically couple to a GPU 108 via an advanced graphics port (AGP) bus. In general, the AGP bus is an industry standard method of attaching graphics functionality to the computer system's 100 motherboard. The North bridge 106 also may couple the CPU 102, the memory 104, and the GPU 108 to the other peripheral devices in the system through, for example, a primary expansion bus (BUS A) such as a PCI bus or an EISA bus.

Various components that operate using the bus protocol of BUS A may reside on this bus, such as an audio device 110, an IEEE 1394 interface device 112, and a network interface card (NIC) 114. These components may be integrated onto the PCB, or they may be plugged into expansion slots 118 that are connected to BUS A. If other secondary expansion buses are provided in computer system 100, another bridge logic device 119 may be used to electrically couple the primary expansion bus, BUS A, to a secondary expansion bus (not shown). As mentioned above, the bridge logic device 119 is sometimes referred to as a "South bridge" because of its position with respect to other system components.

In some embodiments, two or more of the components shown in FIG. 1 may be implemented as a single component. For example, in some embodiments, the GPU may be integrated along with the North bridge 106 or any other component with the computer system 100.

The computer system 100 may couple to one or more display units 120 via the GPU 108. In this manner, the computer system 100 may support rendering computer generated graphic images to the one or more display units 120. In some embodiments, at least one of the one or more display units 120 may be integrated within the computer system 100, such as in the case of a laptop type computer system.

As indicated by the dashed line, the computer system 100 may be contained within an enclosure 122. Further, the enclosure 122 may have a limited thermal capacity or budget. For example, in some embodiments, the thermal budget for the enclosure 122 may be 32 watts. As mentioned previously, many electronic devices, such as computer system 100, are manufactured in increasingly smaller enclosures 122 such that the thermal budget for the device may decrease with successive product generations.

The computer system 100 may ensure that it does not exceed its thermal budget by implementing one or more power regulation circuits 124 or schemes. The one or more power regulation circuits 124 may take the form of temperature monitoring devices. In some embodiments the temperature monitoring devices of in the power regulation circuit 124 may be one or more silicon based diodes (not shown), which may have temperature coefficient of approximately negative two millivolts per degree Celsius. As the temperature increases, the voltage across these diodes may decrease. Similarly, as the temperature decreases, the voltage across these diodes may increase. The power regulation circuit 124 may monitor this changing voltage to determine the operating temperature of the power regulation circuit 124 and/or the computer system 100.

Notably, the GPU in these systems may have the widest variation in operating power and may be one of the largest power consumption components within the computer system 100. For example, the CPU 102 may consume the greatest amount of power at 30 watts, while the GPU 108 may consume the second most amount of power ranging from 5 to 18 watts of power. In this same example the memory 104 may consume approximately 3 to 4 watts of power while the North bridge 106 may consume 2 to 4 watts of power.

Since the GPU 108 may be one of the largest power consumption components within the computer system 100, conventional computer systems often attempt to perform thermal management functions on the GPU 108. Unfortunately, the thermal management functions implemented in conventional computer systems often result in glitches in an image displayed on at least one of the one or more displays 120. These glitches may be because conventional thermal management circuitry often has only a few options to control the heat generated by any particular component within the computer system 100. For example, one such thermal management option is to reduce the speed of the CPU 102 so that it consumes only a minimal amount of power. This may be accomplished by reducing the operational speed of the CPU, however, this action often introduces glitches in the images being rendered by the CPU because there may be insufficient processing power available to deliver, in a timely manner, the images to display motion graphics. These glitches may affect the operation of motion-based graphic items, such as playing movies on the computer system 100.

Figure 2:
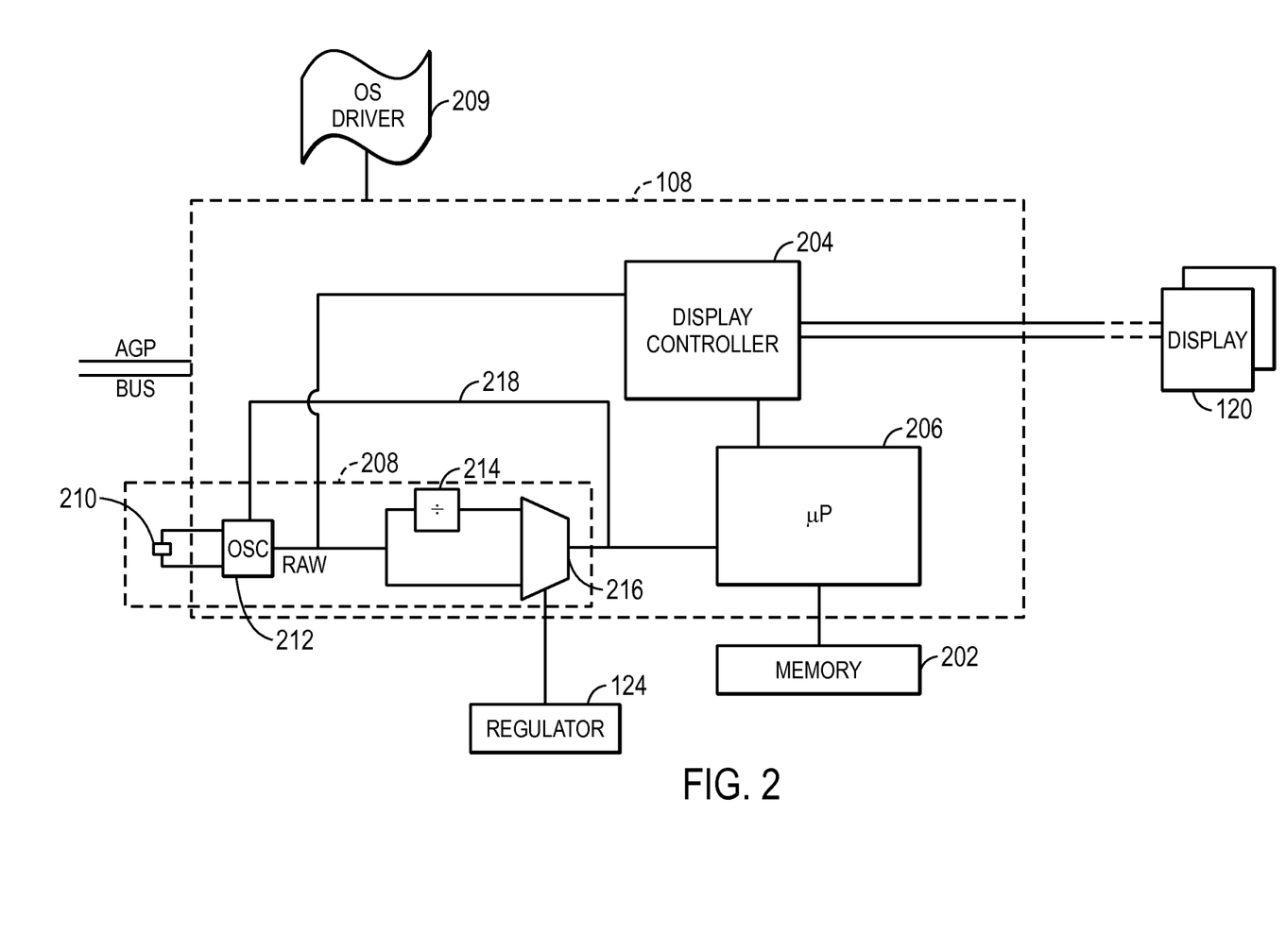
FIG. 2 depicts an exemplary GPU implementing thermal management.

According to at least some embodiments, the power regulation circuit 124 may implement thermal management functions on the computer system 100 without causing glitches in the image displayed on the one or more displays 120. FIG. 2 illustrates the GPU 108 with such a thermal management scheme. Referring to FIG. 2, the GPU 108 may receive data via the AGP bus and process and display it to the one or more displays 120. Also, as shown, the GPU 108 may receive a GPU_ENABLE signal (described in more detail below with regard to FIG. 3A) from the power regulation circuit 124.

A memory 202 may be coupled to the GPU 108. In some embodiments, the memory 202 may be the same as the memory 104 in the computer system 100. In other embodiments, the memory 202 may be a dedicated video memory such as a video random access memory (VRAM) that is separate from the memory 104. During operation, the memory 202 may store data operated upon by the GPU 108.

As is illustrated in FIG. 2, the GPU 108 may include a display controller 204, a microprocessing engine 206, and clock circuitry 208. The display controller 204 may render images on the one or more displays 120 by conveying picture format data to the one or more displays 120. In some embodiments, the format used to convey video data between the display controller 204 and the one or more displays 120 is the digital visual interface (DVI) standard. In other embodiments, the format is the video graphics array (VGA) standard. Embodiments that include DVI and/or VGA are exemplary only, in fact, other standards and/or video standards may be used in alternative embodiments. The microprocessing engine 206 may be coupled to the display controller 204 and may provide raw image data that is then formatted by the display controller 204 into data that can be displayed by the one or more displays 120.

An operating system (OS) driver 209 may couple to the GPU 108 and direct the execution of applications on the GPU 108. The actual OS driver 209 implemented on the computer system 100 may vary. In some embodiments, the OS driver 209 may be an Mac OS driver from Apple Inc. In other embodiments, the OS driver may be a Windows based driver from Microsoft, Inc. Furthermore, it should be appreciated that the OS driver 209 may be any suitable OS driver from any suitable OS.

As far as power consumption of the GPU 108 is concerned, the display controller 204 may consume a relatively constant amount of power while the microprocessing engine 206 may have power consumption that varies with the particular application being executed. In this manner, the microprocessing engine 206 may consume a majority of the power of the GPU 108 when the OS driver 209 directs it to execute a graphics intensive application. For example, the display controller 204 may account for 4 watts of relatively constant power consumption while the microprocessing engine 206 may account for 1 to 18 watts of variable power consumption. Thus if the thermal budget of the enclosure 122 is 18 watts and the display controller 204 and the microprocessing engine 206 are consuming the maximum amount of power, then the thermal budget of the enclosure has been exceeded by approximately 22%. This is but one example of why implementing thermal management of the GPU 108 may be desirable. In addition, implementing thermal management of the GPU 108 may make the overall computer system 100 more energy efficient.

The potentially varying power consumption of components, like the GPU 108, may present special challenges for consumer electronics with smaller enclosures. Because of miniaturization of many computer systems, the enclosure 122 (shown in FIG. 1) may have a smaller thermal budget than a larger enclosure. As a result, smaller electronic devices often have less margin for overages in the variable amount of power consumed and/or heat generated. For example, if the computer system 100 is a desktop computer its enclosure 122 may have a larger thermal budget than a similarly equipped (e.g., similar processor speed, memory capacity, etc.) laptop computer and the laptop computer may not be able to tolerate power overages resulting from varying power consumption. Since these electronic devices may have smaller thermal budgets and less margin for overages in the way of power consumption, it may be desirable to control the variable power consumption that may cause such overages.

Control for the variable power consumption may be provided, in part, by the clock circuitry 208. The clock circuitry 208 may include a crystal 210 that couples to an oscillation circuit 212. While the crystal 210 is shown as coupled between two terminals of the GPU 108, other embodiments may implement the crystal 210 in a single terminal arrangement, where the crystal 210 couples between a single terminal of the GPU 108 and ground. The oscillation circuit 212 may be any type and may further include clock trees and/or frequency modulation circuitry, such as a phase-locked loop (PLL).

The resulting signal from the oscillation circuit 212 may be a RAW clock signal that may be coupled to the display controller 204. The RAW clock signal also may be coupled to the divider 214 where it is modified by a divide value and then provided to a multiplexer 216. The RAW clock signal may be a frequency synthesized signal from a crystal oscillator. For example, in some embodiments, the RAW clock signal may come from a PLL that synthesizes a relatively frequency stable clock signal coming from a crystal oscillator. Other embodiments may implement a delay-locked loop (DLL) to achieve the same functionality. An exemplary RAW clock frequency range includes from about 100 MHz to about 1 GHz.

The divider 214 may provide a divided down version of the RAW clock signal having a lower frequency than the RAW clock signal. In some embodiments, divider values for divider 214 may include 2 to 32. In other embodiments, the divider value may be set such that the timing signal of the divider may have a very low frequency, and in some cases may be close to zero. Thus, if the divider 214 is a 3-bit divider capable of being set at values ranging from 2 to 256, then the divider 214 may be configured to have a divider value of 256, yielding a very low frequency (shown as 308 in FIG. 3E below).

In some embodiments, the power consumed by microprocessing engine 206 is approximately proportional to the frequency from the divider 214, and therefore, the power consumed by the microprocessing engine 206 may be controlled by controlling the divider values for divider 214. Thus, in the embodiments where the frequency of the timing signal from the divider 214 is substantially zero, the power consumed by the microprocessing engine 206 may be lower than when the timing signal is not substantially zero.

During operation, the multiplexer 216 may select between the RAW clock coming from the oscillation circuit 212 and a divided down version of the same from divider 214. The multiplexer 216 may select this based upon the GPU_ENABLE signal coming from the power regulation circuit 124. The GPU_ENABLE signal may be used to control the multiplexer's selection between the RAW clock coming from the oscillation circuit 212 and a divided down version of the same from divider 214, where the time period that either signal may be selected for may vary based on the pulse width of the GPU_ENABLE signal (as described below in the context of FIG. 3A). As a result of selectively choosing between the RAW clock or a divided down version of the same, the clock signal provided to the microprocessing engine 206, over time, may be a duty-cycle weighted-average value of the two clock rates. In some embodiments, more than two signals are averaged by the multiplexer 216.

By selectively applying the RAW clock and a divided down version of the same, the overall clock signal provided to the microprocessing engine 206 from the multiplexer 216 may be configured by so that the speed of execution of the microprocessing engine 206 may be proactively controlled. That is, logic blocks (not shown) within the microprocessing engine 206 may be triggered to operate off of transitions from the signal coming from the multiplexer 216. (The term "transition" may be used to refer to a high-to-low movement of a signal and/or a low-to-high movement of a signal.) The logic blocks consume a certain amount of power and generate a certain amount of heat with each transition. Because the average of the RAW clock and a divided down version of the same may contain fewer transitions, the amount of heat produced by the GPU 108 may be reduced.

Figure 3A:
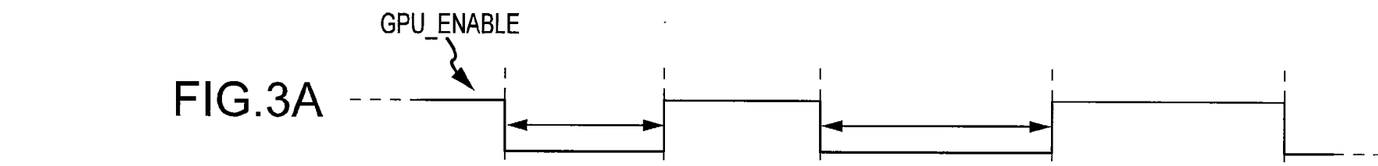
FIG. 3A illustrates an exemplary pulse width modulated signal.

In some embodiments, the GPU_ENABLE signal may be in the form of a pulse width modulated (PWM) signal as shown in FIG. 3A. As shown, the PWM signal may be a signal with varying pulse widths as indicated by the double ended arrows in FIG. 3A. These varying pulse widths may result in one or more varying periods of GPU_ENABLE such as PERIOD A and/or PERIOD B shown in FIG. 3A. In some embodiments, the widths of the PWM signal may vary based on predetermined algorithms within the power regulation circuit 124. In other embodiments, the widths of the PWM signal may vary based on input from the OS driver 209. Other embodiments may implement the GPU_ENABLE signal in the form of an analog voltage level or a register setting.

Figure 3B:
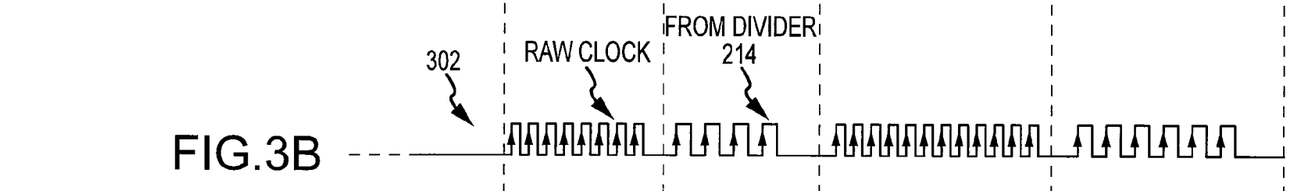
FIG. 3B shows an exemplary clock that may result from the exemplary pulse width modulated signal of FIG. 3A.

When the GPU_ENABLE signal is low, the multiplexer 216 may selectively couple the divided down version of the RAW clock from divider 214 to the microprocessing engine 206. Similarly, when the GPU_ENABLE is high, the multiplexer 216 may selectively couple the RAW clock coming from the oscillation circuit 212 to the microprocessing engine 206. An exemplary resulting clock signal 302 provided to the microprocessing engine 206 is shown in FIG. 3B. Because the pulse width of GPU_ENABLE is wider in PERIOD B than PERIOD A, a greater number of transitions may occur in the clock signal 302. In this example, PERIOD A is shown to include twelve total transitions, eight from the RAW clock and 4 from the divider 214. On the other hand, PERIOD B is shown to contain eighteen total transitions, twelve from RAW clock and six from the divider 214. As a result, the clock signal 302 may have a higher average frequency during PERIOD B than PERIOD A and the GPU 108 may operate at a greater temperature during PERIOD B than during PERIOD A.

Figure 3C:
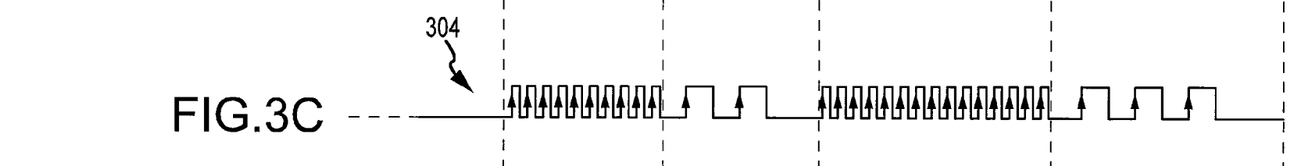
FIG. 3C shows another exemplary clock that may result from the exemplary pulse width modulated signal of FIG. 3A.

The clock signal provided to the GPU 108 may be modified in other ways. In some embodiments, the average number of transitions that occur in the signal provided by the multiplexer 216 may be kept relatively constant and the pulse width of the GPU_ENABLE signal may be kept relatively constant, yet the overall distribution of those transitions may be varied. FIG. 3C represents an exemplary signal 304 with these characteristics.

Referring to FIG. 3C, it can be appreciated that by changing the frequency of the RAW clock (e.g., by adjusting the PLL output) and changing frequency of the signal from the divider 214 (e.g., by adjusting the divider value), different transition profiles may be achieved. Comparing the signal 302 to the signal 304, they have the same number of transitions during PERIOD A and PERIOD B respectively, and therefore the GPU 108 may execute approximately the same number of operations during PERIOD A and PERIOD B respectively. Although the overall number of transitions during any given period of the signals 302-308 may be the same, the distribution of the transitions may vary. That is, during PERIOD A, the signal 304 may contain more transitions from the RAW clock and fewer from the divider 214. As a result, the GPU 108 may execute more instructions in the RAW clock portion of PERIOD A when the signal 304 is provided to the GPU 108 than if the signal 302 is provided to the GPU 108. Likewise, during PERIOD B, although the same number of transitions occur in both the signals 302-308, more of those transitions occur during the RAW clock portion in the signal 304 than in the signal 302. Thus, the amount of heat generated by the GPU 108 versus time for the signals 302-308 may be different even though the same number of operations may be executed by the GPU 108. This feature may be desirable if the packaging of the GPU 108 changes (for example, because of a cost decision at some later point during manufacturing), and as a result, the ability of the GPU 108 to dissipate heat changes.

Figure 3D:
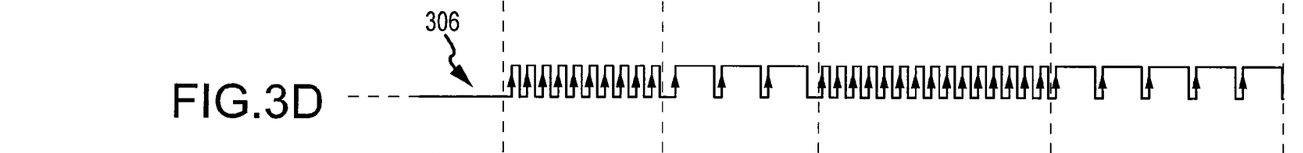
FIG. 3D illustrates an exemplary timing signal achieved by elongating portions of the RAW clock provided to the microprocessing engine.

In some embodiments, alternative transition profiles also may be achieved by elongating portions of the RAW clock provided to the microprocessing engine 206. FIG. 3D illustrates an exemplary timing signal 306 with such a transition profile.

Figure 3E:
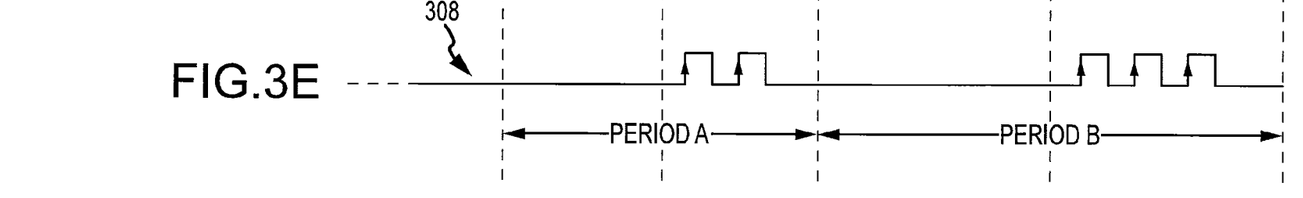
FIG. 3E illustrates an exemplary timing signal where the RAW clock has a frequency of substantially zero for at least a portion of the signal period.

In still other embodiments, the alternative profiles also may be achieved by programming the divider 214 to a divider value that results in the RAW clock having a frequency of substantially zero. For example, FIG. 3E illustrates an exemplary timing signal 308 where the RAW clock has a frequency of substantially zero for at least a portion of the signal period.

By providing the signals 302-308 to the microprocessing engine 206, the variable power consumption requirements of the microprocessing engine 206 may be more finely controlled by modifying the rate of execution of applications being executed on the microprocessing engine 206 independent of the operation of the display controller 204. If the signals 302-308 were applied to the display controller 204, this may result in glitches on the one or more displays 120.

Furthermore, since the signals 302-308 may be applied to the microprocessing engine 206 while the microprocessing engine 206 may be executing commands from the OS driver 209, this may result in fewer glitches in the images displayed on the one or more displays 120. Without providing the signals 302-308 to the microprocessing engine 206, the OS driver 209 may need to wait for the microprocessing engine 206 to be finished with any particular set of instructions before it can implement thermal management mechanisms. In other words, without providing the signals 302-308, the OS driver 209 may have to fit clock modifications within processing breaks of the microprocessing engine 206. Waiting for processing breaks to occur before implementing thermal management techniques may cause the microprocessing engine 206 to continue to increase in temperature even though the power regulation circuit 124 may indicate that thermal management needs to be implemented. By the time the power regulation circuit 124 is able to implement some form of thermal management (i.e., at the next break in processing), the GPU 108 may already be consuming so much power such that drastic measures may need to be taken, such as shutting down the GPU 108 completely. For example, if the GPU 108 is consuming too much power and thermal management cannot be implemented by the OS driver 209, then the computer system 100 may simply power the GPU 108 down to prevent catastrophic damage.

Powering down the GPU 108 in this manner may result in glitches in the image rendered on the one or more displays 120. By providing a signal 302 to the microprocessing engine 206 these glitches may be prevented from occurring because the microprocessing engine 206 may have its power actively (as opposed to passively) controlled so that the number of times the GPU 108 is catastrophically shut down is minimized. Implementing this thermal management scheme may be particularly desirable in portable systems (where the thermal budget is relatively small), which support multiple displays and may require additional processing by the microprocessing engine 206 (and therefore generate additional heat).

In some computer systems, applications called "thermal viruses" may be maliciously implemented. These thermal viruses deliberately contain no processing breaks in the code such that the computer system will be powered down from thermal overload. By implementing the signal 302 the effects of these thermal viruses may be overcome because the power regulation circuit 124 may control the heat generated regardless of the OS driver 209 having to wait for processing breaks.

In some embodiments, the oscillation circuit 212 may de-skew one or more of the timing signals at various points along the timing path. For example, the signal coming from the divider 214 to the multiplexer 216 may be routed across the GPU 108, thereby introducing clock skew. In these situations, the oscillation circuit 212 may utilize a PLL to remove this skew by comparing the signal in question to the signal generated by the oscillation circuit 212, for example through connection 218. It should be noted that connection 218 is but one representation of circuitry capable of providing timing signals to the microprocessing engine 206 and other, more complicated circuitry, is also possible.

What is claimed is:

1. A graphics processing unit (GPU) comprising:
   a display controller;
   a microprocessing engine coupled to the display controller;
   a clock circuit coupled to the display controller and to the microprocessing engine, the clock circuit comprising:
      clock generation circuitry directly coupled to the display controller, wherein the clock generation circuitry is configured to provide only a raw clock signal to the display controller;
      a divider directly coupled to the clock generation circuitry, wherein the divider is configured to generate a divided version of the raw clock signal; and
      a multiplexer directly coupled to the clock generation circuitry and to the divider, wherein the multiplexer is configured to selectively provide the raw clock signal or the divided version of the raw clock signal to the microprocessing engine as a timing signal.

2. The GPU of claim 1, wherein the divider is configured to be adjusted such that the divided version of the raw clock signal has a frequency of substantially zero.

3. The GPU of claim 1, wherein the microprocessing engine is configured to execute operations at a reduced rate of execution based at least in part on the timing signal while the display controller operates at a rate of execution based at least in part on the raw clock signal.

4. The GPU of claim 1, wherein the timing signal provided to the microprocessing engine represents an average of the raw clock signal and the divided version of the raw clock signal.

5. The GPU of claim 4, wherein the multiplexer is configured to receive a pulse width modulated (PWM) signal from a power regulation circuit, wherein the average value represented by the timing signal is modified using the PWM signal.

6. The GPU of claim 5, wherein the PWM signal is based at least in part on a measurement of a temperature change of the GPU.

7. The GPU of claim 5, wherein the PWM signal is based at least in part on temperature changes of a diode junction.

8. The GPU of claim 1, comprising at least one additional clock signal provided to the multiplexer, wherein the timing signal provided to the microprocessing engine represents an average of the raw clock signal, the divided version of the raw clock signal, and the at least one additional clock signal.

9. The GPU of claim 1, wherein the multiplexer is configured to control a composition of the timing signal over a period, wherein the timing signal comprises a greater first number of transitions from the raw clock signal than a second number of transitions from the divided version of the raw clock signal.

10. The GPU of claim 9, wherein multiplexer is configured to modify the composition of the timing signals over the period while the GPU is executing instructions by modifying a proportion between the first number of transitions from the raw clock signal compared to the second number of transitions from the divided version of the raw clock signal.

11. The GPU of claim 10, wherein a sum of the first number of transitions and the second number of transitions in the timing signal over the period is substantially constant despite the proportion between them being modified.

12. The GPU of claim 10, wherein the multiplexer is configured to adjust a sum of the first number of transitions and the second number of transitions in successive periods of the timing signal according to a GPU_ENABLE signal, wherein the GPU_ENABLE signal consists of a PWM signal, a changing voltage level, or a register setting.

13. The GPU of claim 1, wherein the clock generation circuitry is configured to receive the timing signal, wherein the clock generation circuitry is configured to de-skew the timing signal.

14. The GPU of claim 1, wherein the multiplexer is configured to modify the timing signal independent of breaks in code being executed by the microprocessing engine.

15. The GPU of claim 1, wherein the multiplexer is configured to modify a transition profile of the timing signal while maintaining an overall number of operations executed by the microprocessing engine.

16. A method for controlling a graphics processing unit (GPU) comprising:
   providing a raw clock signal;
   generating a divided version of the raw clock signal;
   providing a display controller the raw clock signal but not the divided version of the raw clock signal;
   providing a microprocessing engine a timing signal that selectively comprises the raw clock signal or the divided version of the raw clock signal;
   varying a composition of the timing signal based at least in part on a GPU_ENABLE signal, wherein the GPU_ENABLE comprises a pulse width modulated (PWM) signal or a register setting, or both;
   executing operations on the microprocessing engine at a reduced rate based at least in part on the timing signal; and
   operating the display controller at a rate of execution based at least in part on the raw clock signal.

17. The method of claim 16, wherein the timing signal represents an average of the raw clock signal and the divided version of the raw clock signal.

18. The method of claim 16, wherein the divided version of the raw clock signal is generated such that a frequency of the divided version of the raw clock signal is substantially zero.

19. The method of claim 16, wherein varying the composition of the timing signal comprises providing a greater first number of transitions from the raw clock signal in the timing signal than a second number of transitions from the divided version of the raw clock signal.

20. The method of claim 19, comprising modifying a proportion between the first number of transitions from the raw clock signal compared to the second number of transitions from the divided version of the raw clock signal.

21. The method of claim 20, wherein a sum of the first number of transitions and the second number of transitions in the timing signal over a period is substantially constant despite the proportion between them being modified.

22. The method of claim 20, wherein modifying the proportion is independent of breaks in code being executed by the microprocessing engine.

23. The method of claim 16, comprising ceasing operations of a thermal virus.

24. The method of claim 16, comprising modifying a transition profile of the timing signal while maintaining an overall number of operations executed by the microprocessing engine.

25. A computer system comprising:
a central processing unit (CPU);
a graphics processing unit (GPU) coupled to the CPU, wherein the GPU is configured to generate image data;
one or more displays coupled to the GPU, wherein the one or more displays are configured to display the image data; and
a power regulation circuit coupled to the GPU, wherein the power regulation circuit is configured to monitor a temperature of the GPU and to transmit a pulse width modulated (PWM) signal to the GPU to control power consumption of the GPU;
wherein the GPU comprises:
a display controller;
a microprocessing engine coupled to the display controller;
a clock circuit directly coupled to the display controller and to the microprocessing engine, the clock circuit comprising:
an oscillation circuit directly coupled to the display controller, wherein the oscillation circuit is configured to provide only a raw clock signal to the display controller;
a divider directly coupled to the oscillation circuit, wherein the divider is configured to generate a divided version of the raw clock signal; and
a multiplexer directly coupled to the oscillation circuit, to the divider, and to the power regulation circuit, wherein the multiplexer is configured to selectively provide the raw clock signal or the divided version of the raw clock signal to the microprocessing engine as a timing signal based at least in part on the PWM signal from the power regulation circuit.

26. The computer system of claim 25, wherein the divider is configured to be adjusted such that the divided version of the raw clock signal has a frequency of substantially zero.

27. The computer system of claim 25, comprising an operating system (OS) driver, wherein the OS driver is configured to control a pulse-width of the PWM signal.

28. The computer system of claim 27, wherein the PWM signal is based at least in part on a measurement of a temperature change in the computer system.

29. The computer system of claim 28, wherein the PWM signal is based at least in part on temperature changes of a diode junction of the power regulation circuit.

30. The computer system of claim 25, wherein a predetermined algorithm within the power regulation circuit is configured to control a pulse-width of the PWM signal.

31. The computer system of claim 25, wherein the microprocessing engine is configured to execute operations at a reduced rate of execution based at least in part on the timing signal while a portion of the GPU operates at a rate of execution based at least in part on the raw clock signal.

32. The computer system of claim 25, wherein the microprocessing engine is configured to execute operations at a reduced rate of execution based at least in part on the timing signal while the display controller operates at a rate of execution based at least in part on the raw clock signal.

33. The computer system of claim 25, wherein the multiplexer is configured to modify the timing signal to an average value based at least in part on the PWM signal.

34. The computer system of claim 25, wherein the multiplexer is configured to control a composition of the timing signal over a period, wherein the timing signal comprises a greater first number of transitions from the raw clock signal than a second number of transitions from the divided version of the raw clock signal.

35. The computer system of claim 34, wherein multiplexer is configured to modify the composition of the timing signals over the period while the GPU is executing instructions by modifying a proportion between the first number of transitions from the raw clock signal compared to the second number of transitions from the divided version of the raw clock signal.

36. The computer system of claim 35, wherein a sum of the first number of transitions and the second number of transitions in the timing signal over the period is substantially constant despite the proportion between them being modified.

37. The computer system of claim 25, wherein the multiplexer is configured to modify the timing signal independent of breaks in code being executed by the microprocessing engine.

38. The computer system of claim 37, wherein the computer system is portable.

39. The computer system of claim 38, wherein the computer system comprises at least two displays.

40. The computer system of claim 25, wherein the multiplexer is configured to modify a transition profile of the timing signal while maintaining an overall number of operations executed by the microprocessing engine.

* * * * *